United States Patent [19]

Jacobson

[11] Patent Number: 4,781,761

[45] Date of Patent: Nov. 1, 1988

[54] TITANIUM DIOXIDE PIGMENT COATED WITH BORIA-MODIFIED SILICA

[75] Inventor: Howard W. Jacobson, Wilmington, Del.

[73] Assignee: E. I. Du Pont de Nemours and Company, Wilmington, Del.

[21] Appl. No.: 857,324

[22] Filed: Apr. 30, 1986

[51] Int. Cl.$^4$ ................................................. C09C 1/36
[52] U.S. Cl. ................................. 106/446; 106/287.34
[58] Field of Search ...................... 106/300, 309, 287.34

[56] References Cited

U.S. PATENT DOCUMENTS 3,437,502  4/1969  Werner ................................ 106/300
4,125,412  3/1979  West .................................... 106/300

FOREIGN PATENT DOCUMENTS 73340   3/1984  European Pat. Off. .
654558  3/1979  U.S.S.R. .

OTHER PUBLICATIONS

Derwent Abstract Accession No. 68-79883P/00, Belgian No. 686536.
Derwent Abstract Accession No. 74-53261V/29, Russian No. 399517, Feb. 5, 1974.
Derwent Abstract Accession No. 84-304183/49, Japanese No. 59190239, Oct. 29, 1984.
Derwent Abstract Accession No. 84-236538/38, Russian No. 1070123, Jan. 30, 1984.
Derwent Accession No. 84-104095/17, Japanese No. 59046701, Mar. 16, 1984.

*Primary Examiner*—Amelia B. Yarbrough
*Attorney, Agent, or Firm*—David J. Gould

[57] ABSTRACT

Pigments are disclosed which consist essentially of rutile $TiO_2$ particles bearing coatings comprising $SiO_2$ and $B_2O_3$.

13 Claims, No Drawings

TITANIUM DIOXIDE PIGMENT COATED WITH BORIA-MODIFIED SILICA

BACKGROUND OF THE INVENTION

The present invention relates generally to coated $TiO_2$ particles for use as pigments, and particularly to $TiO_2$ particles having densified silica coatings.

$TiO_2$ has a high refractive index for its density, which renders it a superior pigment for use in coatings, e.g., paints. However, $TiO_2$ is photoactive; exposure to ultraviolet radiation results in generation of free radicals on the surface of $TiO_2$ particles. Thus, where a $TiO_2$ pigment is employed in a paint exposed to sunlight, free radicals are generated which can migrate to the film-forming component of the paint, resulting in coating degradation or failure.

Therefore, minimizing free radical migration is desireable in order to provide lightfast and stable pigments for coating use. A widely-used approach to the problem of providing lightfastness involves coating $TiO_2$ particles with a layer of densified silica. The following patent references disclose conventional silica coating densification techniques.

Werner, U.S. Pat. No. 3,437,502, discloses $TiO_2$ pigment having high opacity and dispersibility, which is obtained by applying a dense silica coating to $TiO_2$ followed by topcoating with alumina. The silica coating is applied by increasing the pH of a slurry of $TiO_2$ particles to above 7. A predetermined quantity of sodium silicate is then added to the slurry, resulting in a rise in pH of the slurry to above 8, generally above 11. The pH is then gradually reduced over a period of several hours by addition of dilute acid, and the resulting silica-coated particles are cured at pH 6.0 to 7.5, at 60° to 100° C., for 30 minutes to several hours. The resulting product is then coated with alumina.

West, U.S. Pat. No. 4,125,412, discloses preparation of durable $TiO_2$ pigments by slurrying silica-coated $TiO_2$ particles at pH 9 to 10.5 while maintaining slurry temperature at 80° to 100° C.

European Patent Application No. 73,340 describes a similar method for coating $TiO_2$ particles with amorphous dense silica prior to topcoating with alumina. Silica is applied by adding a soluble silicate to a $TiO_2$ slurry at a temperature of at least 85° C. and at a pH of from 9.8 to 10.1. The slurry is then neutralized in at least three neutralization steps by addition of acid.

Common to the teachings of the foregoing references is a requirement for relatively high temperatures and high alkalinity during the silica densification step. An extremely lightfast white pigment for use in paint systems can be made by depositing 4-6 weight percent amorphous dense silica on rutile $TiO_2$ pigment. To coat the base $TiO_2$ pigment with this quantity of dense silica requires several hours at 85°-90° C., during which mineral acids are used to precipitate silica from $Na_2SiO_3$. This high temperature coating operation requires use of steel tanks, since less costly fiberglass tanks are not rated for use in the 85°-90° C. temperature range. Methods for providing dense coatings of more than 4 weight percent silica at lower temperatures, e.g., 65°-80° C., to allow use of fiberglass tanks, would be of significant interest to the $TiO_2$ pigment industry.

It has now been found that codeposition of $B_2O_3$ with $SiO_2$ provides dense silica coatings at process temperatures which permit use of fiberglass slurry tanks. The boria-containing pigments resulting from this process are highly lightfast, and exhibit excellent gloss and dispersibility.

SUMMARY OF THE INVENTION

The present invention provides a pigment consisting essentially of $TiO_2$ particles bearing coatings comprising $SiO_2$ and $B_2O_3$. In a process aspect, the present invention provides a process for preparing $TiO_2$ particles bearing coatings of boria-modified silica, comprising:

(a) forming an aqueous slurry of rutile $TiO_2$ at a temperature from about 65° C. to about 90° C.;
(b) adjusting pH of the slurry to the range 7–10.5;
(c) adding a predetermined quantity of a solution comprising $Na_2SiO_3$ and $B_2O_3$, under conditions which maintain silicate and boria ions in solution;
(d) gradually lowering pH of the slurry to about 7.5–8.5 by addition of acid, thereby depositing a coating of silica and boria; and
(e) curing the resulting coated pigment at a temperature from about 65° C. to about 90° C. for a period of at least 15 minutes.

DETAILED DESCRIPTION OF THE INVENTION

In accordance with the present invention, $B_2O_3$ is codeposited with $SiO_2$ on $TiO_2$ particles, providing lightfast, durable pigments. The $TiO_2$ particles making up the pigments bear dense silica coatings, yet are produced at temperatures significantly lower than those required by other silica densification processes capable of providing dense silica coatings at greater than 4 weight percent.

In practice, silica/boria layers are codeposited from a master solution of $Na_2SiO_3$ and $Na_2B_2O_4$. A standard acid solubility test can be to measure effectiveness of coating densification. In addition to enhanced densification of $SiO_2$ in the presence of $B_2O_3$, an improvement in pigment brightness is provided.

The $TiO_2$ used to prepare the pigment of the invention can be of the conventional rutile variety, prepared by either the chloride or sulfate process.

The amount of silica or silica topcoated with alumina which the particles bear as coatings can be varied depending primarily upon the pigment's intended use. Generally, the silica coatings will constitute from 2-10% of the total pigment weight, and an alumina topcoat, if present, will constitute 0.5-5% of the total weight of the particles. Preferably, the silica coating constitutes 4-8% of the total weight of the pigment particles. Preferably, the alumina topcoat, if present, constitutes 1-4% of the total weight.

The amount of alumina the particles bear as coatings, expressed as percent by weight, is calculated by first determining the alumina content of the coated pigment by ion plasma spectroscopy. The alumina content of the uncoated rutile $TiO_2$ is similarly determined, and the alumina content attributable to the coating is determined by computing the difference between coated and uncoated alumina contents.

The pigment of the present invention can be prepared from an aqueous slurry containing 200-450 grams per liter $TiO_2$. This slurry is brought to 65°-90° C. and is held at that temperature throughout the preparation procedure. The slurry is adjusted to pH 7-10.5, and a sufficient quantity of solution containing $Na_2SiO_3$ and $Na_2B_2O_4$, or separate solutions of $Na_2SiO_3$ and $Na_2B$-

$_2O_4$, is added to provide a coating of the desired composition and weight. Upon addition of the $Na_2SiO_3$ and $Na_2B_2O_4$ solution(s), pH of the slurry increases to about 11. Generally, slurry pH must be maintained above about 10 to maintain silicate and boria ions in solution.

Generally, the weight and composition of the coatings to be deposited will be determined by the composition of the master $Na_2SiO_3/Na_2B_2O_4$ solution, the quantity added to the slurry containing $TiO_2$, and quantity of $TiO_2$ in the slurry. For $TiO_2$ slurries containing 400 g/L $TiO_2$, about 40-50 mL of a master aqueous solution, containing 400 g $SiO_2$ equivalent and 40 g $B_2O_3$ equivalent per liter, should be added per liter $TiO_2$ slurry to provide coatings approximating 5% of pigment weight. The compositions of the coating solutions can be varied as required to provide variations in coating weight and composition.

The coatings applied to $TiO_2$ particles in accordance with the present invention can contain from 60-95 percent by weight $SiO_2$ and 0.5-30% by weight $B_2O_3$, based upon coating weight. Preferably, coatings will contain 80-90 percent by weight $SiO_2$ and 2-20 percent by weight $B_2O_3$.

Upon addition of the coating solutions, the pH of the $TiO_2$ slurry will rise to the range 10.5-11.5. Over a period of 2-4 hours, 15% aqueous HCl or other mineral acid is added to gradually decrease slurry pH to about 8.0. As acid is added, $SiO_2/B_2O_3$ will be deposited and densified on the surfaces of the $TiO_2$ particles. After all acid is added, the pigment should be cured at 65°-90° C. for 30 minutes.

If desired, alumina can be precipitated on silica/boria coated $TiO_2$ particles by adding enough sodium aluminate to the slurry, at a temperature from about 50°-90° C., to provide a concentration of about 2-8% by weight of the $TiO_2$. Acid, normally sulfuric or hydrochloric, is added at the same time to maintain the pH of the slurry within the range 6-9 as the alumina is precipitated. After addition of aluminate is complete, the slurry is allowed to cure, with continuous stirring, for 15-30 minutes.

The resulting pigment is then separated from the liquid by filtration or centrifugation, washed with water, and dried.

Coating compositions can be prepared with the pigments of the invention in conventional ways, e.g., by blending the pigment with a film-forming component and a liquid carrier.

The following examples illustrate particular aspects of the present invention. In the examples, all parts and percentages are by weight and all degrees are Celsius unless otherwise indicated.

EXAMPLE 1

In a large plastic vessel equipped with stirring apparatus and a pH probe, 9000 parts water are mixed with 3000 parts rutilee $TiO_2$.

The resulting slurry is heated to 75°, and the pH is adjusted to about 7.5 by addition of NaOH. 400 parts of an aqueous solution containing 400 parts $SiO_2$ equivalent (as $Na_2SiO_3$) and 40 parts $B_2O_3$ equivalent (as $Na_2B_2O_4$) per 1000 parts water are added. The pH of the resulting mixture is then determined, and sufficient 15% aqueous HCl is added, over a period of about 3 hours, to reduce the slurry pH to about 8.0. After all HCl has been added, the slurry is cured for 30 minutes at pH 8.0 and 75°.

The resulting coating, which constitutes about 5.5% by weight of the total pigment, contains $SiO_2$ and $B_2O_3$ in a ratio by weight of about 90:10.

A coating of 2.5hydrous alumina is then deposited on the pigment by simultaneous gradual addition of 200 mL $NaAlO_2$ solution (containing $NaAlO_2$ equivalent to 400 g $Al_2O_3$ per liter solution) and HCl, such that the pH of the slurry is continuously maintained from about 7.0 to about 7.5.

The resulting coated pigment is cured by holding for about 30 minutes at ambient temperature and pH 7.5. The pigment is then filtered from the slurry, washed free of salts with water, and air-dried. The pigment is then micronized, using 3 lbs. superheated steam per lb. pigment. The resulting pigment is suitable for use in paint systems where lightfastness is required.

EXAMPLE 2

In this series of experiments, several batches of pigment were prepared to evaluate the effect of $B_2O_3$ co-deposition and various processing temperatures upon acid solubility. Generally, acid solubility is inversely related to chalk-fade resistance for $TiO_2$ pigments.

The pigments described below were prepared by procedures substantially similar to that described in Example 1, above, except that processing temperatures were varied as indicated in Table 1, below. Acid solubilities were determined as follows.

10 mL 66% sulfuric acid is added to a test tube containing a magnetic stirring bar, and the tube is placed in an aluminum heating clock and heated to 175°. A 0.2000 g pigment sample is added to the tube, and digested for 1 hour with stirring. At the conclusion of the digestion period, the tube containing the pigment sample is cooled by pouring the acid mixture into a beaker of ice, and the residue in the tube and beaker is washed with distilled water. The pigment residue in the tube and beaker is collected in a 100 mL volumetric flask, the volume made up to 100 mL by addition of distilled water, and the contents mixed thoroughly. The contents of the volumetric flask are then filtered, and 10 mL of the resulting filtrate are added to a 25 mL volumetric flask, to which 2 mL 20% hydrogen peroxide, and sufficient 10% sulfuric acid to make 25 mL, are added. The resulting solution is allowed to stand one hour. Absorbance of the solution is then read at 400 nm using a 10 mm cell path. Soluble $TiO_2$ is determined by reference to a previously prepared spectrophotometric curve obtained by measurement of samples containing known quantities of dissolved $TiO_2$.

TABLE 1

| Processing | Acid Solubility: (% dissolved $TiO_2$) Coating Composition: | |
|---|---|---|
| Temp. (°C.) | 100% $SiO_2$ | 90% $SiO_2$/10% $B_2O_3$ |
| 90 | 0.11 | 0.10 |
| 80 | 0.27 | 0.12 |
| 70 | 3.34 | 0.17 |
| 65 | 6.0 | 0.22 |

EXAMPLE 3

A mill base is made by mixing

| | |
|---|---|
| Pigment of Example 1 | 387 parts |
| alkyd resin | 149.6 parts |
| (Syntex ® 3145; | |
| Celanese Coatings Co.) | |

-continued

| n-butanol | 9.4 parts |
| xylol | 79 parts. |

This mixture is sand ground, and then the sand is filtered from the mill base. A paint is made by mixing 100 parts of the mill base with the following:

| xylol | 1.4 parts |
| alkyd resin (Syntex ® 3145; Celanese Coatings Co.) | 71.8 parts |
| melamine resin solution (Cymel ® 248-8, 55% solids, American Cyanamid Co.) | 38.5 parts |

What is claimed is:

1. A pigment consisting essentially of rutile $TiO_2$ particles bearing coatings consisting essentially of $SiO_2$ and $B_2O_3$, wherein the coatings constitute 2-10% of the total pigment weight.

2. A pigment according to claim 1, wherein the $TiO_2$ particles have coatings consisting essentially of from 60-98 percent by weight $SiO_2$ and 0.5-30 percent by weight $B_2O_3$, based on coating weight.

3. A pigment according to claim 2, wherein the $TiO_2$ particles have coatings consisting essentially of from 80-90 percent by weight $SiO_2$ and 2-20 percent by weight $B_2O_3$, based on coating weight.

4. A pigment according to claim 1 wherein the $TiO_2$ particles have $SiO_2/B_2O_3$ coatings constituting 4-8% of the total pigment weight.

5. A pigment according to claim 4, wherein the $TiO_2$ particles have outer coatings of alumina constituting 0.5-5% of the total weight of the particles.

6. A pigment according to claim 5, wherein the $TiO_2$ particles have outer coatings of alumina constituting 1-4% of the total weight of the particles.

7. A process for preparing $TiO_2$ particles bearing coatings of boria-modified silica, comprising:
   (a) forming an aqueous slurry of rutile $TiO_2$ at a temperature from about 65° C. to about 90° C.;
   (b) adjusting pH of the slurry to the range 7-10.5;
   (c) adding a predetermined quantity of a solution comprising $Na_2SiO_3$ and $B_2O_3$, under conditions which maintain silicate and boria ions in solution;
   (d) gradually lowering pH of the slurry to about 7.5-8.5 by addition of acid, thereby depositing a coating of silica and boria; and
   (e) curing the resulting coated pigment at a temperature from about 65° C. to about 90° C. for a period of at least 15 minutes.

8. A process according to claim 7, wherein sufficient $Na_2SiO_3$ and $B_2O_3$ are added in step (c) to provide a coating consisting essentially of from 70-99.5 percent by weight $SiO_2$ and 0.5-30 percent by weight $B_2O_3$, based on coating weight.

9. A process according to claim 8, wherein sufficient $Na_2SiO_3$ and $B_2O_3$ are added in step (c) to provide a coating consisting essentially of from 80-98 percent by weight $SiO_2$ and 2-20 percent by weight $B_2O_3$, based on coating weight.

10. A process according to claim 9, wherein sufficient $Na_2SiO_3$ and $B_2O_3$ are added in step (c) to provide a $SiO_2/B_2O_3$ coating constituting 0.5-10% of the total pigment weight.

11. A process according to claim 10, wherein sufficient $Na_2SiO_3$ and $B_2O_3$ are added in step (c) to provide a $SiO_2/B_2O_3$ coating constituting 4-8% of the total pigment weight.

12. A process according to claim 11, comprising the following additional step:
   (f) adding sufficient $NaAlO_2$ to the slurry, at a temperature from about 50°-90° C., to provide a concentration of about 2-8% by weight of the $TiO_2$, while adding mineral acid to maintain the pH of the slurry from 6-9.

13. A paint containing the pigment of any one of claims 1-3 or 4-12.

* * * * *